Patented Mar. 6, 1928.

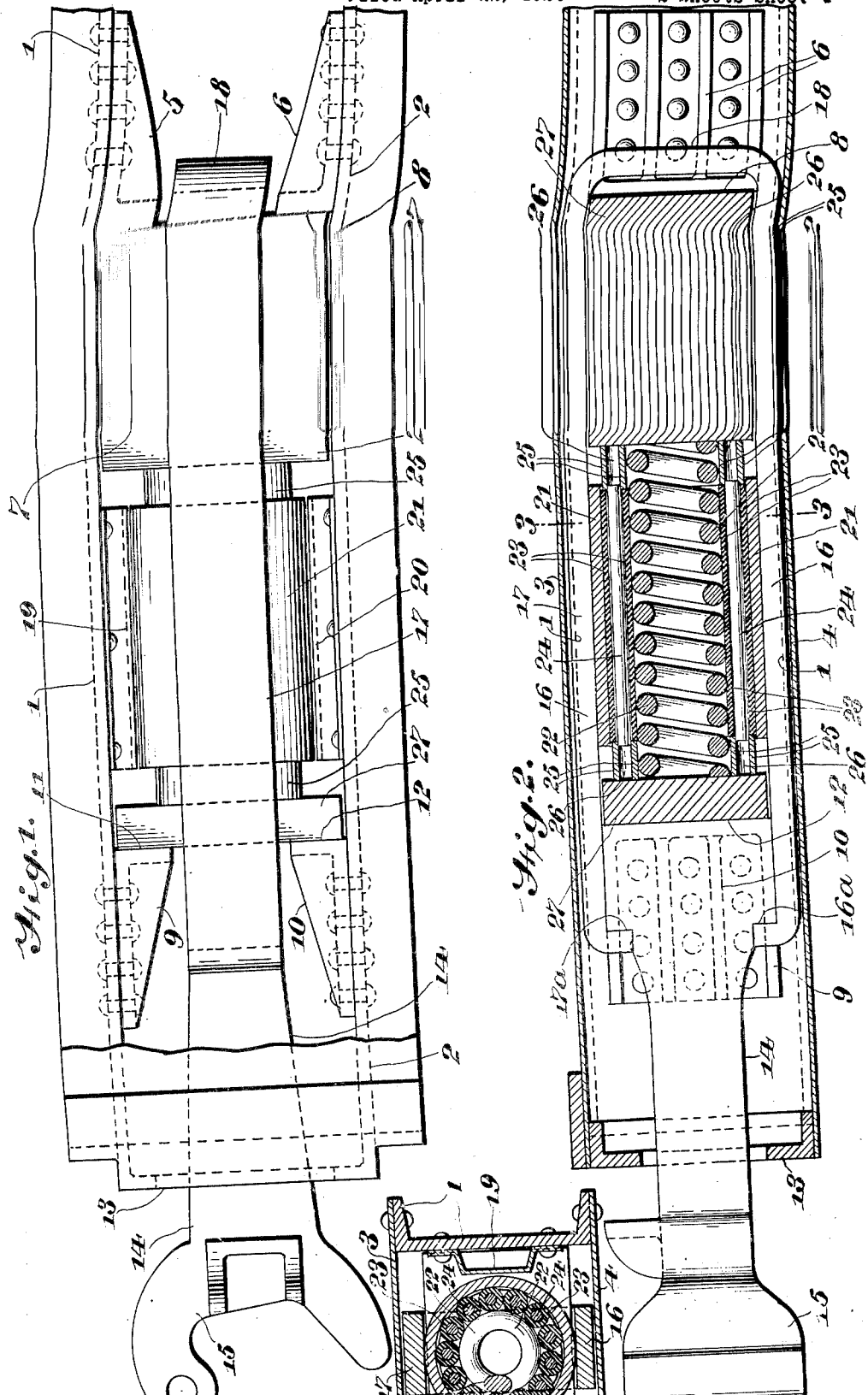

1,661,177

UNITED STATES PATENT OFFICE.

WILLIAM HAMILTON, OF NEWARK, OHIO.

BUFFER MECHANISM.

Application filed April 22, 1924. Serial No. 708,145.

My invention relates to buffer mechanism utilizable for absorbing shocks, reducing the rate of application of suddenly applied forces, for interconnecting members subject to sudden changes of position with respect to each other, and for kindred purposes.

In accordance with my invention resilient or compressible material, such as rubber or equivalent, is so disposed as to transmit force from one member to another and in so doing to undergo compression and exert friction upon associated means in opposition to the applied force.

More particularly in accordance with my invention the compressible material is hollow or tubular and upon application of a force is compressed against and exerts friction upon an internal core member and an external confining means.

Further in accordance with my invention there is disposed within a confining member a series of hollow or tubular members of compressible resilient friction material, each provided with a core member, whereby upon application of a force the several units are simultaneously compressed and simultaneously exert friction, the extent of the friction surface effected by the several units being great as compared with the volume occupied by the units.

Further in accordance with my invention there is utilized with the series of units a spring or mass of compressible material, as rubber composition or the like, against which the compressible members of the units are compressed and upon which they frictionally engage.

Further in accordance with my invention I provide a draft rigging for vehicles, such as freight or passenger railway cars, provided with buffer mechanism of the character above referred to.

Further in accordance with my invention buffer mechanism of the character referred to is applied between the body or chassis and the axle structure of vehicles, and particularly motor vehicles, such as automobiles and the like.

Further in accordance with my invention buffer mechanism of the character described is applied to vehicle wheels, between the hub and rim or felloe.

My invention resides in structure of the character hereinafter described and claimed.

For an illustration of some of the various forms my invention may take reference is to be had to the accompanying drawings in which:

Fig. 1 is a top plan view of draft rigging for railway cars.

Fig. 2 is a side elevational view of the structure shown in Fig. 1, partly in a vertical longitudinal section.

Fig. 3 is a cross sectional view on the line 3—3 of Fig. 2.

Fig. 4 is a vertical sectional view, partly in elevation, of my buffer mechanism as applied between body and axle structures of a vehicle.

Fig. 5 is a horizontal sectional view, on enlarged scale, on the line 5—5 of Fig. 4.

Fig. 6 is a vertical sectional view, partly in elevation, of a modified form of my buffer structure as applied between the body and axle structures of a vehicle.

Fig. 7 is a horizontal sectional view, on enlarged scale, taken on the line 7—7 of Fig. 6.

Fig. 8 is a fragmentary side elevational view, partly in vertical section, of a vehicle wheel having my buffer mechanism applied thereto.

Referring to Figs. 1, 2 and 3, there is shown a draft rigging as utilized for example upon railway freight cars. It comprises a housing comprising channel irons or members 1 and 2 secured to the body structure of the car and the plates 3 and 4 riveted to the flanges of the members 1 and 2. Riveted to the housing members 1 and 2 are the draft lugs 5 and 6 through whose active faces or ends 7 and 8 are transmitted to the car body certain of the forces hereinafter referred to. Adjacent the forward end of the draft rigging housing are the draft lugs 9 and 10 riveted to the housing members or sills 1 and 2 and through whose active ends or faces 11 and 12 there is transmitted to the car body the draw bar pull. Secured to or formed upon the forward end of the housing or sills is the strike plate 13 through an opening in which extends the draw bar 14 carrying as usual at its forward end the coupler member 15. At its inner end the draw bar 14 is secured to the draw bar yoke comprising the side bars 16 and 17 integrally joined at their inner ends by the transversely extending member 18.

Disposed within the draw bar yoke, between its side bars 16 and 17, and between the cylinder guide members 19 and 20 secured respectively to the housing channels In this case again the spring 22 and the members 23 oppose approach of the members 30 and 31 to each other by their opposing resilient forces, and in addition the members 23, which are compressed between the rings 35 and 36, exert friction upon their cores 24, cylinder 21 and spring 22. Accordingly the buffer mechanism opposes rapid approach of members 30 and 31 toward each other.

Referring to Figs. 6 and 7, the buffer mechanism is disposed between the upper and lower halves 31 and 38 of a vehicle spring. The structure is substantially that described in Fig. 4, except that in lieu of the helical spring 22 there is provided an internal compressible member 39, of rubber or equivalent material which opposes compression and upon which the compressible tubes or members 23 frictionally engage when compressed.

Referring to Fig. 8, there is shown a portion of a vehicle wheel comprising the hub 40, spokes 41 and rim or felloe 42. Between the hub and felloe, as in or with each spoke, there operates a buffer mechanism of the character herein described. In the example illustrated the cylinder 21 is secured by its flange 33 to the felloe. The outer end of the spoke is movable longitudinally within the cylinder 21 and engages the upper plate or washer 36 provided with guide holes for the core members 24.

Here again the action is that hereinbefore described in opposing to the forces causing change of position of the hub 40 with respect to the felloe 42 the forces of compression of the spring 22 (or rubber member 39 if employed) and of the compressible members 23, and also by the friction developed by the members 23 upon their cores 24 and upon the cylinder 21 and the spring 22, or member 39 if used in lieu of spring 22.

It will be understood that in lieu of the spring 22, Figs. 2 and 3, there may be utilized any other suitable member either compressible, as a member 39, Fig. 6, or an incompressible member, against which the compressible members 23 may frictionally engage.

What I claim is:

1. Draft rigging comprising a draw bar, and buffer mechanism intervening between said draw bar and the vehicle and comprising a chamber, a series of members of relatively soft compressible resilient material therein, resilient means within said chamber between which and the wall of said chamber said compressible members are confined, the material from which said resilient means is formed differing in character from said compressible resilient material, and means for transmitting force from said draw bar to said compressible members for compressing them and for developing friction upon the wall structure of said chamber and said means.

2. Draft rigging comprising a draw bar, and buffer mechanism intervening between said draw bar and the vehicle and comprising a chamber, a series of members of compressible resilient material therein, a coiled spring within said chamber and between which and the wall of said chamber said compressible members are confined, and means for transmitting force from said draw bar to said spring and said compressible members for compressing them and for developing friction between them and the wall structure of said chamber and said spring.

3. Draft rigging comprising a draw bar, and buffer mechanism intervening between said draw bar and the vehicle and comprising a chamber, a series of hollow members of compressible resilient material therein, means within said chamber between which and said chamber said hollow members are confined, cores in said hollow members, and means for transmitting force from said draw bar to said hollow members to compress them and to develop friction between them and said chamber, said means and said cores.

4. Buffer structure comprising a chamber, a plurality of tubular members of compressible resilient material disposed therein, cores for said tubular members, and abutments between which said tubular members are longitudinally confined and compressed against said chamber and said cores.

5. Buffer structure comprising a chamber, a plurality of tubular members of compressible resilient material therein, cores in said members, follower rings having apertures for receiving said cores and movable with respect to each other within said chamber for compressing said members upon said cores and against said chamber.

6. Buffer structure comprising a chamber, a plurality of tubular members of compressible resilient material therein, cores in said members, follower rings having apertures for receiving said cores and movable with respect to each other within said chamber for compressing said members upon said cores and against said chamber, and a compressible member within said chamber and against which said hollow members are compressed and frictionally engage.

7. Buffer structure comprising a chamber, a plurality of tubular members of compressible resilient material therein, cores in said members, follower rings having apertures for receiving said cores and movable with respect to each other within said chamber for compressing said members upon said cores and against said chamber, and a helical spring within said chamber engaged by said hollow members and compressed simultaneously therewith.

8. Buffer structure comprising a chamber, a resilient compressible tube-like member confined within said chamber, means for compressing said member including a draw bar exterior of the casing, and means against which said member is compressed to develop friction which increases as the degree of compression, said last mentioned means comprising a rigid member spaced from said draw bar positioned within said tube-like member.

9. Buffer structure comprising a chamber, a resilient compressible tube-like member confined within said chamber, means for compressing said member, and means against which said member is compressed to develop friction which increases as the degree of compression, said last mentioned means comprising a rigid member positioned within said tube-like member and a coiled spring exteriorly thereof and in contact therewith.

10. Buffer structure comprising a chamber, a resilient compressible tube-like member confined within said chamber, means for compressing said member, and means against which said member is compressed to develop friction which increases as the degree of compression, said last mentioned means comprising a rigid member within said tube-like member and surfaces tangentially located with respect to the circumferential wall of said tube-like member.

11. Buffer structure comprising a member forming a chamber, a plate at one end of said chamber, a plurality of elongated members of resilient compressible material circumferentially disposed within said chamber, cores within said members, a coiled spring concentrically disposed with respect to said material, and means for moving said plate to thereby increase the friction exerted by said members against the wall of said chamber, said cores and said coiled spring.

12. Buffer structure comprising a member forming a chamber, a plurality of elongated members of resilient compressible material confined within said chamber, cores in some of said members, and means movable with respect to the casing for compressing said members to increase the friction developed against the wall of said chamber and said cores.

13. Draft rigging comprising spaced draft sills, oppositely disposed stops on said sills, end plates engaging said stops, and buffer mechanism comprising a longitudinally expansible member engaging said plates, a housing whose ends are spaced from said plates, and compressible resilient material disposed between said housing and member in engagement with said expansible member.

14. Draft rigging comprising spaced draft sills, oppositely disposed stops on said sills, end plates engaging said stops, and buffer mechanism comprising a longitudinally expansible member engaging said plates, a housing whose ends are spaced from said plates, and compressible resilient members circumferentially disposed between said housing and member in engagement with said expansible member.

15. Draft rigging comprising spaced draft sills, end plates on said sills, means preventing movement of each plate in one direction, a longitudinally expansible member restricting movement of said plates toward each other, a housing surrounding said member, compressible resilient members disposed between said member and housing, and cores in said last mentioned members.

16. Draft rigging comprising spaced draft sills, end plates on said sills, means preventing movement of each plate in one direction, a longitudinally expansible member restricting movement of said plates toward each other, a housing surrounding said member, compressible resilient members disposed between said member and housing, cores in said last mentioned members, and means co-operating with said cores for compressing said resilient members.

WILLIAM HAMILTON.

March 6, 1928.
C. JOBST
1,661,178
STAMPING OR EMBOSSING MACHINE
Filed June 6, 1923   2 Sheets-Sheet 1
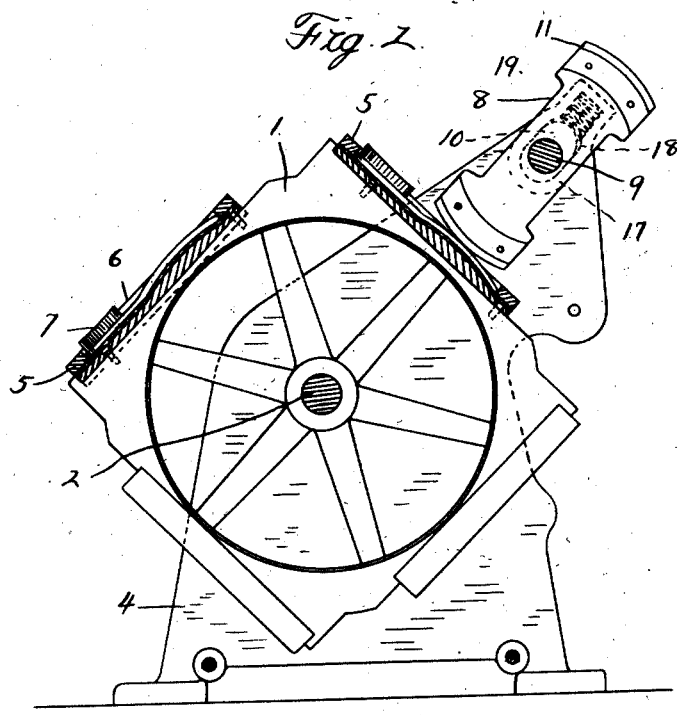
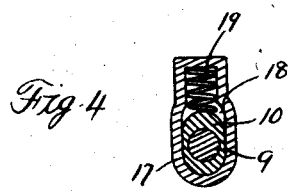
Inventor
Conrad Jobst
Attorneys